Dec. 16, 1947.   P. H. SEIBEL   2,432,632
ARTIFICIAL FLORAL DISPLAY
Filed Feb. 23, 1946

Phillip H. Seibel,
Inventor.
Haynes and Koenig,
Attorney.

Patented Dec. 16, 1947

2,432,632

UNITED STATES PATENT OFFICE 2,432,632

ARTIFICIAL FLORAL DISPLAY

Phillip H. Seibel, St. Louis, Mo.

Application February 23, 1946, Serial No. 649,538

3 Claims. (Cl. 240—10)

This invention relates to an illuminated floral ornament, and more particularly to a luminescent ornamental artificial flower display.

Among the objects of the invention are the provision of an illuminated floral ornament wherein simulated flowers are caused to luminesce by illuminating means concealed within a simulated flower holder or container including a bail, and the provision in such a display of simulated flowers comprising petals made of visually attractive light-displaying material on stems of light-transmitting material, each of said petals and stems maintaining a simulation to natural appearances. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a view in elevation of the new illuminated floral ornament;

Similar reference characters indicate corresponding parts throughout the several views of the drawings.

Figure 1:
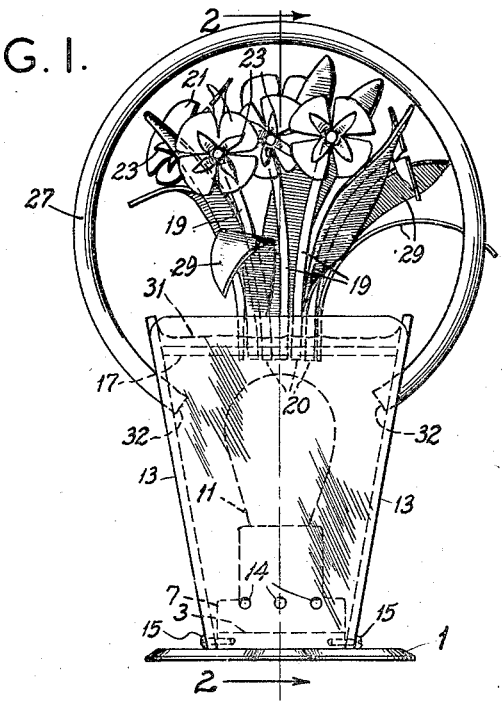

Referring now to the drawings, the illuminated floral ornament comprises a base 1, formed of plastic or any other suitable material, to which a plate 3, of wood or the like, is secured by means of screws 5. A lamp socket 7 is secured to plate 3 by means of screws 9. Electrical conductors 10 are secured to terminals on said socket. A lamp 11, preferably of low wattage (for example, 15 to 25 watts), so as to avoid heating and softening of the material of which the illuminated floral ornament is composed, is mounted in lamp socket 7. The lamp and its socket are enclosed within an opaque casing 13, which may be formed of any suitable material, such as a black plastic material. The casing 13, having ventilating apertures 14 therein, and an aperture for passage of conductors 10, is preferably of truncated pyramidal form, in simulation of a flower container, such as a flower basket or pot, and its lower, smaller end is telescoped over plate 3 and secured thereto by means of screws 15. The upper, larger end of casing 13 is closed by a plate 17 formed of the same material as the casing. The lamp and its socket are thus concealed within a simulated flower container.

Curved rods 19, simulating flower stems, are secured at their lower ends in apertures centrally of plate 17. These rods are formed of transparent light-transmitting plastic material. Rods 19 preferably extend completely through plate 17 so that their lower ends are in close proximity and exposed to rays from the lamp 11 and their lower ends 20 are preferably roughened as by sandblasting so as to obtain maximum capture of light for diffusion into said rods. Their upper ends 26 are also roughened as by sandblasting in order to produce an end glow by means of the light transmitted along the rod. The sides of the rods are highly polished to minimize lateral diffusion of light therefrom. The polish reflects a light beam along any curves that the rod may be given for stem-simulating purposes, the beam traveling to the other end and without an excessive amount escaping laterally from the polished sides.

Figure 4:
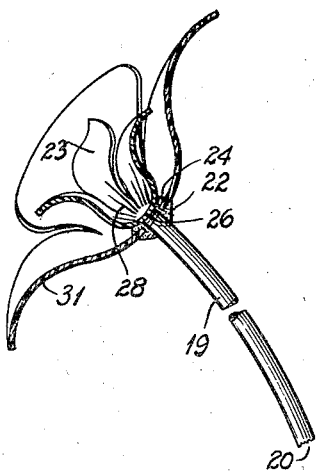
Figure 2:
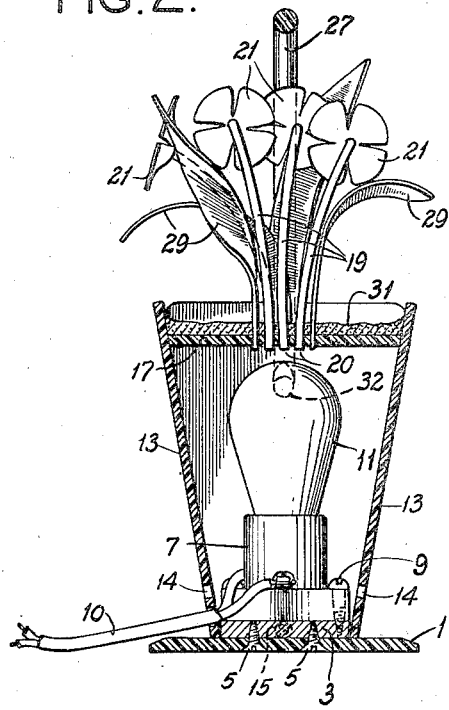
Fig. 2 is a view in section taken on line 2—2 of Fig. 1.
Figure 3:
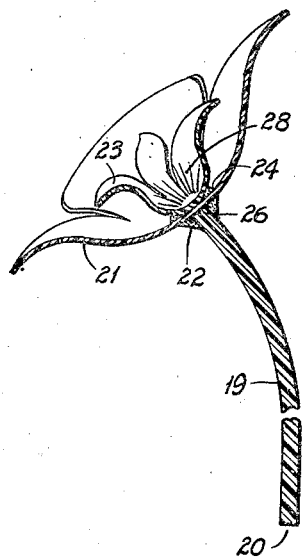
Fig. 3 is a section through one embodiment of one of the flowers of the illuminated floral ornament; and, Fig. 4 is a section through an alternative embodiment of one of said flowers.

Simulated flower petals 21 and 23, cut and formed from colored translucent sheet plastic material, are attached by means of suitable adhesive to the upper ends of rods 19, which are also roughened. These petals may be cut and formed from suitably colored sheet cellulose nitrate or cellulose acetate plastics, or any other suitable sheet plastic. An attractive sheen is obtained from a plastic material. Each cluster of petals 21 and 23 is formed in the shape of a cup. The cup-shaped petal cluster 21 may have its base abutting the end of rod 19 and affixed thereto by transparent acetate adhesive 22, and the cup-shaped petal cluster 23 may be secured within the cup 21, as illustrated in Fig. 3, by transparent acetate adhesive 24. Alternatively, a cup-shaped petal cluster 31 may have an aperture in its base and be affixed to rod 19 with the end of the rod 19 projecting through said aperture, and petal cluster 23 may have its base abutting the end of rod 19 and adhesively secured thereto, as illustrated in Fig. 4. It will also be understood that rod 19 may project through apertures in both of the cup-shaped petal clusters.

A handle or bail 27 formed of light-transmitting plastic material has its ends secured in and projecting through apertures in opposite side walls of casing 13. Said ends may be roughened, to attain diffusion of light into the handle which then glows to a limited extent, thus enhancing the ornamental appearance of the display. The appearance of the display is further enhanced by a cluster of leaves 29 cut and formed from green plastic sheet material and secured in apertures in the plate 17. Granular material 31 of various colors, such as the dust resulting from the cutting of the plastic sheets, is adhesively secured to the upper side of plate 17, so as to present the appearance of soil in the simulated flower container.

When the lamp 11 is lit, light is transmitted through the stem-simulating, preferably white, rods 19 and creates a concentrated brilliant glow or flare at the centers of the petal clusters. This, in view of the polished sides of the rods 19, occurs with minimum lateral diffusion of light from the rods, thus preserving their simulation of the flower stems. Some light is also diffused by the adhesive 22 and 24 from the rods into and through the petals, causing a glowing effect therein and at the edges thereof.

The following features of the invention deserve emphasis:

The stem-simulating rods 19, formed with highly polished lateral surfaces and roughened opposite ends 26, serve as effective light-gathering means at 20, and effective light-displaying means at 26, without substantial loss of light laterally from the polished surfaces. These surfaces guide the light from the end 20 to the end 26. The result is a jewel-like concentration, scintillation or flare of light in the core of the flower, as indicated at 28 in Figs. 3 and 4. This effect is attained because not much light is lost laterally from the stem throughout its curved length. Such a loss of light would not only detract from the scintillation 28, but would give the stems an unnatural appearance, which is to be avoided. In other words, the very limited loss of light laterally from the polished surface of the stems is not enough to destroy their appearance as stems, but is enough to give them a lush appearance. At the same time, a large amount of light during travel axially along the stem is conserved for the brilliant effect desired in the core of the simulated flower at 28.

It will be understood that the inner ends 32 of the bail 27 are also roughened in order to absorb light from the source 11.

Another point of importance is that in both forms of the invention shown in Figs. 3 and 4, at least part of the sheet material forming the simulated flower covers the outer end of the stem 19. Thus any coloration in the material 21 (Fig. 3) or 23 (Fig. 4) will serve as a light filter so that the display core of light 28 will assume the color of the material or materials covering the end of the stem. For example, in Fig. 3, if the members 21 and 23 are yellow, then the core of light 28 will be yellow. If, in Fig. 4, the material of member 23 is red, then the core of light will be red, etc.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. A simulated floral display comprising a single opaque compartment, a light source in said compartment, a plurality of transparent surface polished plastic stems having roughened ends within the compartment and exposed to said light source, said stems passing to the exterior of the compartment and simulating flower stems, at least part of said stems being curved, said stems having their external ends roughened to produce concentrated light-display flares, plastic simulated flower petals located near the ends of said stems respectively and about said light-display flares, plastic sheets simulating leaves organized with said stems and attached to said compartment, and a transparent plastic polished rod forming a bail over the simulated leaves and flowers and having roughened ends, said bail intersecting said opaque compartment near its ends to present said ends interiorly of the compartment to said light source.

2. An illuminated floral ornament comprising an opaque casing simulating a flower holder, illuminating means enclosed within said casing, a plurality of curved light-transmitting plastic rods, each rod having one end secured in an aperture in the top of said casing and extending generally upwardly therefrom, and having means simulating flower petals formed of translucent plastic material secured to the other end thereof, and a handle formed of light-transmitting transparent plastic material having its ends secured in apertures in the wall of said casing.

3. An illuminated floral ornament comprising a base, a plate secured to said base, a lamp socket having a lamp therein secured to said plate, an opaque casing simulating a flower holder having an open lower end telescoped over said plate and removably secured thereto, an opaque plate closing the upper end of said casing, a plurality of curved light-transmitting transparent plastic rods each having its lower end secured in an aperture in said opaque plate and extending generally upwardly therefrom and each having secured to its other end cup-shaped elements simulating flower petals formed of translucent sheet plastic material, and a handle formed of light-transmitting transparent plastic material having its ends secured in apertures in the wall of said casing.

PHILLIP H. SEIBEL.

REFERENCES CITED

The following references are of record in the file of this patent:

UNITED STATES PATENTS

| Number | Name | Date |
| --- | --- | --- |
| 624,392 | Smith | May 2, 1899 |
| 1,921,614 | Frei | Aug. 8, 1933 |
| 2,316,589 | Iwanowicz | Apr. 13, 1943 |